(No Model.)
C. R. ARNOLD.
CURRENT REGULATOR FOR ELECTRIC LIGHT CIRCUITS.
No. 288,393. Patented Nov. 13, 1883.
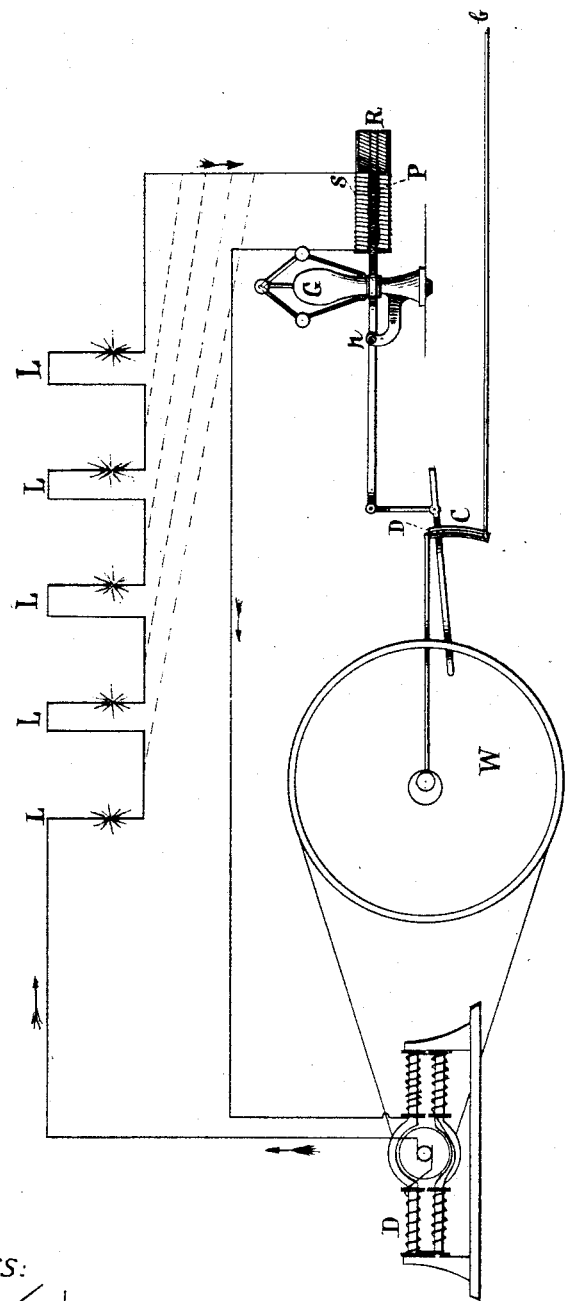
WITNESSES:
INVENTOR
Craig R. Arnold

UNITED STATES PATENT OFFICE.

CRAIG R. ARNOLD, OF PHILADELPHIA, PENNSYLVANIA.

CURRENT-REGULATOR FOR ELECTRIC-LIGHT CIRCUITS.

SPECIFICATION forming part of Letters Patent No. 288,393, dated November 13, 1883.

Application filed May 1, 1883. (No model.)

*To all whom it may concern:*

Be it known that I, CRAIG R. ARNOLD, of the city of Philadelphia, in the State of Pennsylvania, have invented a certain new and useful Improvement in Apparatus for Regulating the Current in Electric-Light Circuits, of which the following is a specification.

My invention relates to apparatus for the automatic regulation of electrical machines for supplying the current for arc-lamps; and it consists in arranging a governor for the engine that supplies power for the dynamo, to be controlled by the return-circuit wire or negative current by means of the mechanism hereinafter described.

Heretofore the regulation of the current has been effected by simply moving the brushes from the neutral point to a point at right angles to it, where it takes off the minimum; and, in consequence, on a five-light circuit, for instance, if four of the lights were extinguished, and therefore only one-fifth of the power of the dynamo was required, the brushes were simply moved around to a point where is taken off only a sufficiently strong current to supply the one remaining lamp, while at the same time the engine runs at its normal speed. In order to slacken the speed of the engine, under such circumstances, automatically and by means of the electric current, I have devised mechanism whereby the return or negative current operates to wholly or partly raise the weight on the governor-rod, and so control the speed of the engine, and in consequence the strength of the current proceeding from the dynamo.

In the accompanying drawing is shown a sectional view of the apparatus, in which D represents a dynamo-machine, from which proceeds a wire carrying an electric current moving in the direction of the arrows and supplying a current to the lamps L L in the circuit, from whence it is carried by the return-wire through the apparatus shown at R and P, and from thence to the dynamo again. W is a fly-wheel arranged on the crank-shaft of the engine which operates the dynamo-machine. C is a link cut-off controlled by the governor G, connected with it by a rod, r. The centrifugal motion of the governor, operating to raise the rod r at its outer end, is counteracted by a weight, R, placed on the end of the rod, which holds it down and keeps the governor-block at the top of the link cut-off C. On the end of the rod r next the weight R is wound a coiled spring, P, inclosed within a pipe, S, around which latter the return-current electric wire is wound, and which pipe S is large enough in internal diameter to permit the cylindrical-shaped weight R to be drawn and moved freely within it.

The operation is as follows: If all the lamps in the circuit are burning, the strength of the current is wholly utilized, and the spring P is sufficiently strong to force the weight R out of the pipe S, and holds down the governor-rod, allowing the engine to run at its full speed. Each of the several lamps is supplied with the usual shunting device, which shuts off the supply of electricity to the carbons and transfers the current to the next lamp, and so on in the circuit, (the dotted lines showing the course of the current under such circumstances, not as it is carried in fact, but as an illustration,) so that if one or more of the lamps are not burning, the current thus increased in strength by not being utilized, reaching and traversing the coil around the solenoid S, will have the effect to compress the spring P and draw the weight R wholly or partly within the pipe S, and so permit the governor to raise the rod r, and, depressing the governor-block D within the link of the cut-off C, decrease the travel of the valve-rod b, and consequently slacken the speed of the engine. Thus the speed of the engine, and in turn of the dynamo-machine, will be automatically controlled and regulated by the number of burning lights in the circuit and the strength of the current necessary to keep the same in operation.

Having thus described my invention, what I claim as new, and desire to secure by Letters Patent, is—

1. In combination with the governor of an engine arranged to operate a dynamo or other device used for producing the electric current in an arc electric-light circuit, the solenoid S, placed in the circuit, and the governor-bar r, with its weight R and spring P, the said parts being so arranged that the spring P will be depressed and the rod, with its weight R, be drawn within the solenoid by any increase in the current passing through it on the extinguishment of one or more lights in the circuit, substantially as described.

2. In an apparatus for automatically regulating the speed of an engine arranged to operate mechanism for producing an electric current by means of the electric current generated thereby, and in proportion to the strength of the current required from such machine for the whole or any less number of burning lights in an arc electric-light circuit, the solenoid S, constructed and arranged substantially as described, in combination with a governor-bar, $r$, and longitudinally-sliding weight R, spring P, and a cut-off device connected with such motor-engine, and arranged to automatically regulate the speed of the same when operated upon by the governor.

In witness whereof I have signed my name to this specification in the presence of two witnesses.

CRAIG R. ARNOLD.

Witnesses:
FRANCIS S. BROWN,
H. T. FENTON.